United States Patent
Löhr

(10) Patent No.: US 6,328,190 B1
(45) Date of Patent: Dec. 11, 2001

(54) BICYCLE BAG

(75) Inventor: Hans-Gerhard Löhr, Hamm (DE)

(73) Assignee: Lohr GmbH, Bonen (DE)

( * ) Notice: Subject to any disclaimer, the term of this patent is extended or adjusted under 35 U.S.C. 154(b) by 0 days.

(21) Appl. No.: 09/402,226

(22) PCT Filed: Oct. 4, 1997

(86) PCT No.: PCT/EP97/05455

§ 371 Date: Oct. 1, 1999

§ 102(e) Date: Oct. 1, 1999

(87) PCT Pub. No.: WO98/43871

PCT Pub. Date: Oct. 8, 1998

(30) Foreign Application Priority Data

Apr. 1, 1997 (DE) .............................. 197 13 406

(51) Int. Cl.[7] .................. B62J 7/06; B62J 9/00
(52) U.S. Cl. ................. 224/431; 224/420; 224/437; 224/438; 224/458
(58) Field of Search ................. 224/420, 428, 224/430, 431, 432, 433, 436, 437, 438, 439, 458

(56) References Cited

U.S. PATENT DOCUMENTS

| | | |
|---|---|---|
| 1,908,535 | 5/1933 | Pawsat . |
| 2,253,649 * | 8/1941 | Price ............................ 224/431 X |
| 2,541,640 | 2/1951 | Dennis . |
| 2,783,927 * | 3/1957 | Harley ............................ 224/430 |
| 3,955,727 * | 5/1976 | Montgomery ............ 224/430 X |
| 3,995,803 | 12/1976 | Uitz . |
| 4,328,915 | 5/1982 | Melton, III . |
| 4,353,490 | 10/1982 | Jackson et al. . |
| 4,433,802 | 2/1984 | Woolf . |
| 4,542,839 * | 9/1985 | Levine et al. ................. 224/431 |
| 4,798,318 * | 1/1989 | Irwin ........................... 224/431 X |
| 4,921,151 * | 5/1990 | Duvall ......................... 224/439 X |
| 5,282,554 | 2/1994 | Thomas . |
| 5,439,153 * | 8/1995 | Murdoch et al. ........... 224/153 X |
| 5,653,366 | 8/1997 | Liserre . |
| 6,062,053 * | 5/2000 | Ho ............................... 224/420 X |

FOREIGN PATENT DOCUMENTS

| | | | |
|---|---|---|---|
| 19534204 A1 * | 6/1942 | (DE) .................................. 224/36 |
| 39 27 086 | 1/1991 | (DE) . |
| 93 02 297 | 4/1993 | (DE) . |
| 1127921 * | 12/1956 | (FR) .................................. 224/36 |
| 140627 | 4/1920 | (GB) . |
| 222107 * | 6/1942 | (NO) ................................. 224/36 |
| 94 11233 | 5/1994 | (WO) . |

* cited by examiner

Primary Examiner—Gregory M. Vidovich

(57) ABSTRACT

A bicycle bag having a coupling device arranged on a rear wall thereof for detachable coupling with a coupling section arranged on a bicycle. The elements of the coupling device are neither unsightly nor difficult to manipulate since the coupling device is designed with at least one window in a flat reinforcement plate which is built into the rear wall of the bicycle, is fitted on the outside with an external covering, and includes a cutout above the window, which can be closed by a cover and/or is fitted with an inner covering on the inner side of the reinforcement plate. Suspension elements are also included in the window to receive the coupling section.

9 Claims, 2 Drawing Sheets

BICYCLE BAG

BACKGROUND OF THE INVENTION

1. Field of the Invention

This invention relates to a bicycle bag with an attachment device arranged on a rear for releasable connection with an attachment section arranged on a bicycle, wherein the attachment device has at least one window in which hook elements for receivers of the attachment section are formed.

2. Description of Prior Art

A bicycle bag of this type is found in U.S. Pat. No. 4,433,802, U.S. Pat. No. 4,353,490, French Patent Reference FR 1 127 921, as well as German Patent Reference DE 39 27 086 A1. With all these known bicycle bags, the attachment device has attaching elements, which are attached on an outside of a rear wall, or respectively protrude therefrom, as additional elements. This correspondingly also applies to a container-like bag in accordance with PCT International Application WO 94/11233, which is entirely made of a stiff material. Inter alia, the appearance of this embodiment of the attachment device is spoiled, and there are elements, which interfere with carrying it.

SUMMARY OF THE INVENTION

One object of this invention is to provide a bicycle bag of the type mentioned at the outset which, with a simple construction, is visually unaffected to a large extent by the attachment device when using the bag.

This object is attained with a bicycle bag having at least one window embodied in a flat reinforcement plate, which is integrated into a rear wall of the bicycle bag and is covered toward an exterior by an outer covering, while leaving a cutout over the window free. The cutout can be closed from the exterior by a cover, or can be closed by an inner lining provided on an inside of the reinforcement plate.

Because of the at least one window in the reinforcement plate covered by the outer covering, the attachment device is designed to be completely flat toward the exterior and it does not interfere with its handling aspects. The cover of the cutout on the exterior is not only used for closing the window and the cutout, but also adds to the pleasing appearance of the bicycle bag. The interior of the bag is sealed toward the exterior also by the interior covering which, for example, can be an inner lining made of fabric or plastic, or an inwardly bulging covering of windows. In the simplest case, the windows can be vertically oriented elongated holes, for example, whose upper border surfaces are used as hook-on elements for the hook-shaped reception of the attachment section.

If the hook-on elements are designed as protrusions projecting laterally into the free space of the window surface, a satisfactory attachment to the attachment section results, along with a simple embodiment, for example by stamping, or by a shaping process, wherein for preventing tilt oscillations several hook-on elements can be provided one above the other in a vertical direction.

The bicycle bag which, for example, is connected by a simple hooking process, can be secured against unintentional detachment because the reinforcement plate has a further hole outside of the window, acting as a bolt receptacle. A bolt can be inserted into the hole with a detent mechanism or of a key.

The cover of the cutout is fastened as a flap, which can be tilted away or removed, on the outer covering, or is a part thereof, and the cover has a locking element, which can be brought into a detachable connection with a complementary locking element. The locking element can be, for example, a zipper, a snap fastener or a hook-and-eye closure. It is also possible to combine a zipper and a hook-and-eye strip so that, for example, the zipper is arranged horizontally, and the hook-and-eye strip vertically.

An advantageous additional function is achieved because the cover is designed as a flat pocket or as a belt loop. It is thus also possible to affect the appearance.

Various suitable structural options exist because the reinforcement plate is inserted, sewn or riveted into the rear wall.

BRIEF DESCRIPTION OF THE DRAWINGS

This invention will be explained in greater detail by an exemplary embodiment, making reference to the drawings, wherein.

DETAILED DESCRIPTION OF PREFERRED EMBODIMENTS

Figure 1:
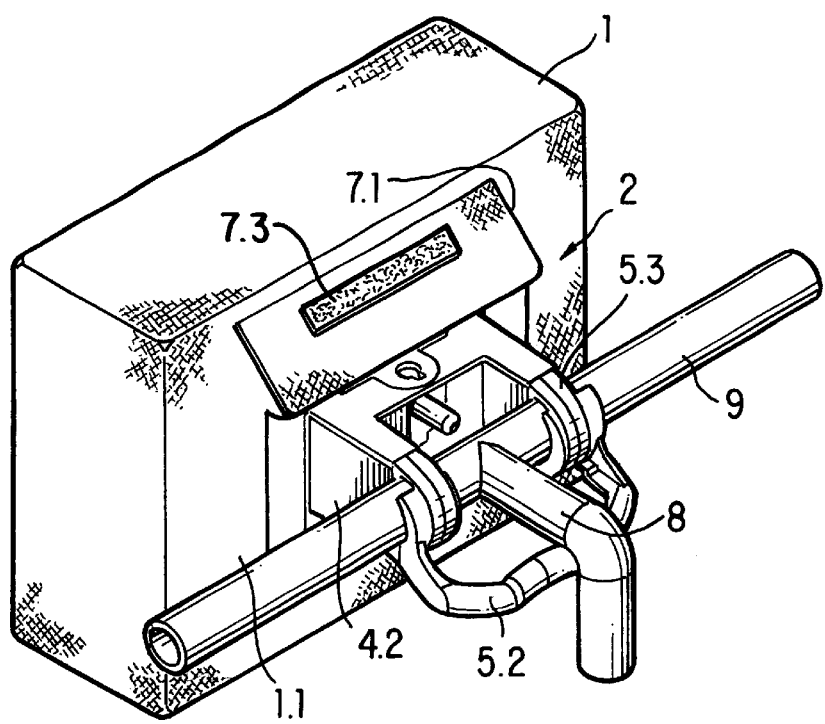
FIG. 1 is a perspective view of a bicycle bag attached to handlebars.

As shown in FIG. 1, a bicycle bag 1 (represented schematically) is attached with a rear wall 1.1 to an attachment section 2, which is installed on handlebars 9 and is protected against twisting by means of a support bridge 5.2 of a holding strap 5 on a handlebar projection 8.

Figure 2:
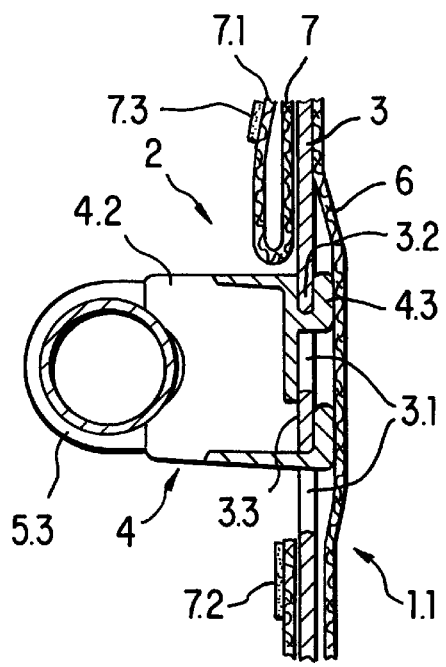
FIG. 2 is a cross section of a portion of the bicycle bag in accordance with FIG. 1, attached to the handlebars.
Figure 3:
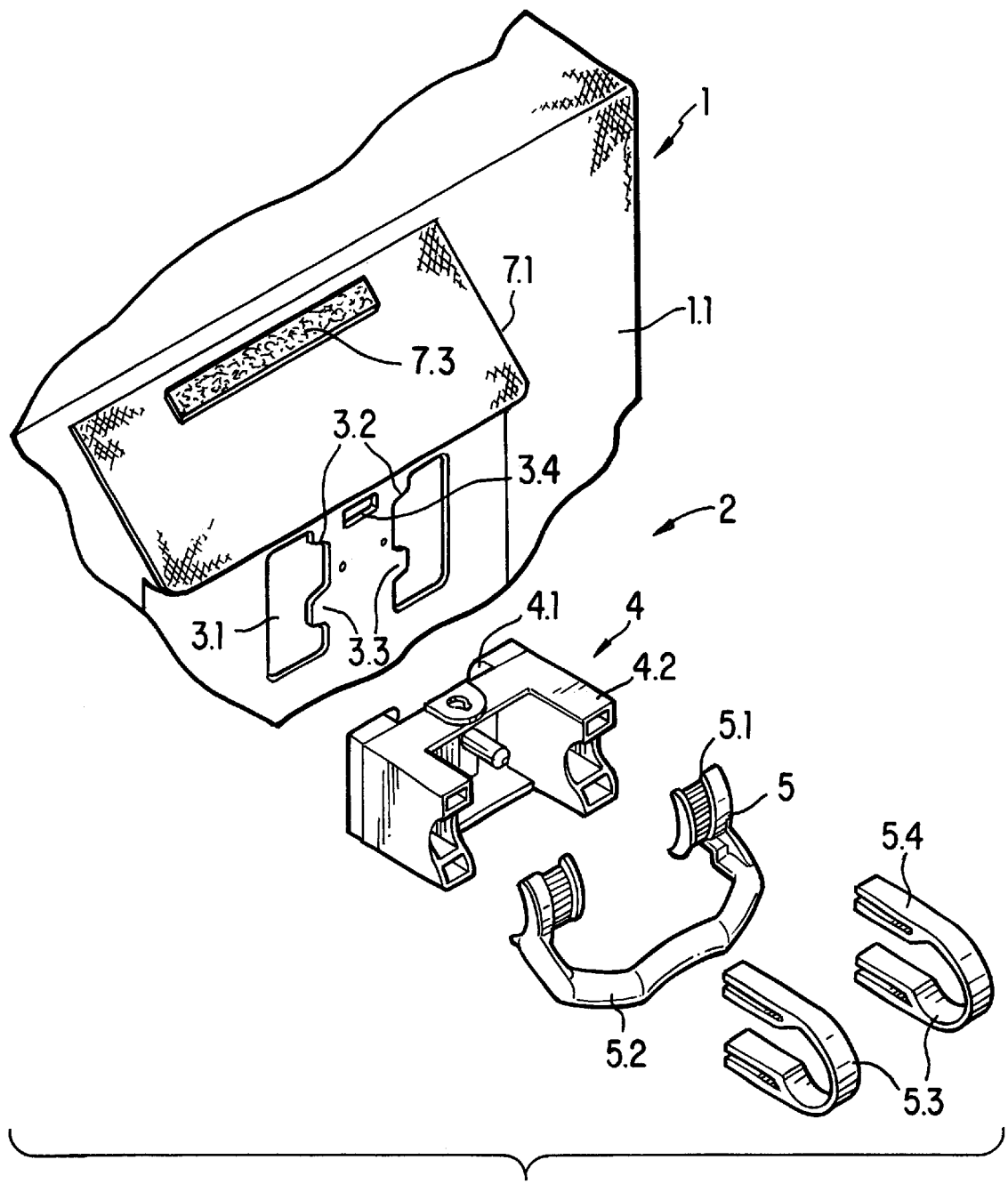
FIG. 3 is an exploded view of portions of the attachment device represented in FIG. 1.

As also shown in FIGS. 2 and 3, in an area facing the bicycle bag 1, the attachment section 2 has an attaching element 4 with a fastening section 4.2, on whose front hook elements 4.3 project upward and downward and form a receiver 4.1. Plugs 5.4 of a clamp 5.3 are introduced into a rear of the attaching element 4, and the clamp 5.3 has teeth on an inside, which cooperate with the teeth 5.1 of the holding strap 5 and fix it against relative rotation.

As shown in FIG. 2 in particular, a reinforcement plate 3 is secured, for example sewn, pushed or welded in, in the rear wall 1.1 of the bicycle bag 1 between an inner lining 6 and an outer covering 7. The reinforcement plate 3 can be made of rigid plastic or metal, for example and, if it is stable enough, it can be a conventional stiffening plate directly, or replace it. Two windows 3.1 are cut or formed out of the reinforcement plate 3, which support on their adjoining vertical sides hook-on elements 3.2, which project inward into the free window space and are located in the window area, and further hook-on elements 3.3. As FIG. 2 shows, in the attached state of the bicycle bag 1, the hook-on elements 3.2 and the further hook-on elements 3.3 are seated in the receivers 4.1 of the attaching element 4 formed behind the hook element 4.2.

Toward the interior, the reinforcement plate 3, including the windows 3.1, are covered by means of the inner lining 6, so that the interior of the bicycle bag 1 is also closed in the area of the windows 3.1. On the exterior, a cutout formed in the outer covering 7 in the area of the windows can be closed off by means of a cover 7.1, for which purpose a locking element 7.3 of the cover 7.1 is connected with a further locking element 7.2 on the outer covering 7. In accordance with FIG. 2, the cover 7.1 is a flap of the outer covering 7, which is flipped up, wherein the outer covering has a hook-and-eye strip all around as the locking element, which can be brought into connection with a correspondingly arranged hook-and-eye strip in the edge area of the cutout. In a similar way, a zipper, snap fasteners or the like, also in suitable combination, can be used as the locking element and further locking element 7.2. The cover 7.1 can also be a piece placed separately on it and can also be designed as a flat pocket. A further option exists because the cover is simultaneously designed as a belt loop which, for exerting the required support force, is firmly connected at the lower edge of the cutout and can be flipped open downward. Further similar design options of the cover are conceivable.

As an alternative embodiment, it is also possible to provide an inwardly bulging cap on an inside of the reinforcement plate 3 as an inner lining 6 for closing the opening of the windows 3.1.

The described design of the bicycle bag 1 therefore results in a flat rear wall without additional holding elements placed on the exterior, by means of which a pleasing appearance is also achieved.

What is claimed is:

1. In a bicycle bag with an attachment device arranged on a rear wall (1.1) of the bicycle bag for releasable connection with an attachment section (2) arranged on a bicycle, wherein the attachment device has at least one window (3.1), the periphery of which defines hook elements (3.2, 3.3) for mating with receivers (4.1) of the attachment section (2), the improvement comprising:

the at least one window (3.1) embodied in a flat reinforcement plate (3) which is integrated into the rear wall of the bicycle bag (1), the rear wall comprising interior and exterior layers;

the reinforcement plate (3) being contained by and between the rear wall interior and exterior layers, and covered by the exterior layer; the exterior layer having a flap (7.1) positionable in a first position over the window and in a second position leaving free access from an exterior of the bag to the window.

2. In the bicycle bag in accordance with claim 1, wherein the hook elements (3.2, 3.3) are designed as protrusions of the window periphery projecting into a free space of the window.

3. In the bicycle bag in accordance with claim 2, wherein the reinforcement plate (3) has a hole (3.4) outside of the at least one window (3.1), the hole forming a bolt receptacle.

4. In the bicycle bag in accordance with 3, wherein the flap has a locking element (7.3) which can be brought into a detachable connection with a complementary locking element (7.2) on the bag to secure the flap.

5. In the bicycle bag in accordance with claim 4, wherein the reinforcement plate (3) is one of sewn and riveted into the rear wall.

6. In the bicycle bag in accordance with claim 1, wherein the reinforcement plate (3) has a hole (3.4) outside of the at least one window (3.1), the hole forming a bolt receptacle.

7. In the bicycle bag in accordance with claim 1, wherein the flap, has a locking element (7.3) which can be brought into a detachable connection with a complementary locking element (7.2) on the bag to secure the flap.

8. In the bicycle bag in accordance with claim 1, wherein the reinforcement plate (3) is one of sewn and riveted into the rear wall.

9. In a bicycle bag with an attachment device arranged on a rear wall (1.1) of the bicycle bag for releasable connection with an attachment section (2) arranged on a bicycle, wherein the attachment device has at least one window (3.1) the periphery of which defines hook elements (3.2, 3.3) for mating with receivers (4.1) of the attachment section (2), the improvement comprising:

the at least one window (3.1) embodied in a flat reinforcement plate (3) which is integrated into the rear wall of the bicycle bag (1), the rear wall comprising interior and exterior layers;

the flat reinforcement plate (3) being contained by and between the rear wall interior and exterior layers;

the exterior layer having a flap positionable in a first position over the window and in a second position leaving free access from an exterior of the bag to the window; and wherein the hook elements (3.2, 3.3) are designed as protrusions projecting laterally into a free space of the window.

* * * * *